United States Patent
Harbourt et al.

(10) Patent No.: US 9,231,492 B2
(45) Date of Patent: Jan. 5, 2016

(54) SYSTEM AND METHOD OF POWER CONVERSION

(71) Applicant: General Electric Company, Schenectady, NY (US)

(72) Inventors: Cyrus David Harbourt, Roanoke, VA (US); Allen Michael Ritter, Salem, VA (US); Robert Gregory Wagoner, Salem, VA (US)

(73) Assignee: General Electric Company, Schenectady, NY (US)

(*) Notice: Subject to any disclaimer, the term of this patent is extended or adjusted under 35 U.S.C. 154(b) by 49 days.

(21) Appl. No.: 14/148,223

(22) Filed: Jan. 6, 2014

(65) Prior Publication Data
US 2015/0194904 A1    Jul. 9, 2015

(51) Int. Cl.
| | |
|---|---|
| H02P 1/30 | (2006.01) |
| H02M 7/06 | (2006.01) |
| H02P 27/04 | (2006.01) |
| H02M 7/483 | (2007.01) |
| H02M 1/00 | (2007.01) |

(52) U.S. Cl.
CPC ............... *H02M 7/06* (2013.01); *H02M 7/483* (2013.01); *H02P 27/04* (2013.01); *H02M 2001/0058* (2013.01)

(58) Field of Classification Search
CPC ........................................................ H02P 27/04
USPC ............................................. 318/503, 34, 558
See application file for complete search history.

(56) References Cited

U.S. PATENT DOCUMENTS

| | | | |
|---|---|---|---|
| 4,406,956 | A | 9/1983 | Clemen et al. |
| 5,828,561 | A | 10/1998 | Lavieville et al. |
| 6,005,787 | A * | 12/1999 | Mizukoshi ............ 363/71 |
| 6,049,226 | A * | 4/2000 | Latzel et al. ............ 326/68 |
| 6,340,851 | B1 | 1/2002 | Rinaldi et al. |

(Continued)

FOREIGN PATENT DOCUMENTS

| | | |
|---|---|---|
| EP | 2372893 A1 | 10/2011 |
| WO | 2008106908 | 9/2008 |

(Continued)

OTHER PUBLICATIONS

Peng, "A Generalized Multilevel Inverter Topology with Self Voltage Balancing", IEEE Transactions on Industry Applications, vol. No. 37, Issue No. 2, pp. 611-618, Mar. 1, 2001.

(Continued)

*Primary Examiner* — David S Luo
(74) *Attorney, Agent, or Firm* — Fletcher Yoder, P.C.

(57) ABSTRACT

Systems and methods for converting power are presented. The power conversion includes conducting load current through a first current path of multiple current paths in a power conversion unit using switches, diodes, or a combination thereof. The power conversion also includes blocking one or more additional current paths of the multiple current paths in the power conversion unit using one or more of the switches, one or more of the diodes, or a combination thereof. Furthermore, the power conversion includes reducing potential voltage stress on the one or more switches by using one or more voltage stress reduction switches to reduce a voltage that is blocked by the one or more blocking switches or diodes by connecting an end of each of the one or more switches opposite to a blocking edge to an intermediate voltage node.

20 Claims, 7 Drawing Sheets

(56) References Cited

U.S. PATENT DOCUMENTS

| | | | |
|---|---|---|---|
| 6,445,353 B1 | 9/2002 | Weinbrenner | |
| 6,930,899 B2 | 8/2005 | Bakran et al. | |
| 7,219,673 B2 | 5/2007 | Lemak | |
| 7,489,487 B2 | 2/2009 | Oka | |
| 7,586,768 B2 * | 9/2009 | Yoshimoto | B60L 11/1881 307/75 |
| 7,830,681 B2 | 11/2010 | Abolhassani et al. | |
| 8,045,346 B2 | 10/2011 | Abolhassani et al. | |
| 8,279,640 B2 | 10/2012 | Abolhassani et al. | |
| 8,374,009 B2 | 2/2013 | Feng et al. | |
| 8,564,981 B2 * | 10/2013 | Harnefors et al. | 363/40 |
| 8,587,141 B2 | 11/2013 | Bjerknes et al. | |
| 2002/0097183 A1 | 7/2002 | Weinbrenner | |
| 2006/0044857 A1 | 3/2006 | Lemak | |
| 2007/0159749 A1 * | 7/2007 | Oka | 361/93.1 |
| 2010/0072824 A1 | 3/2010 | Abolhassani et al. | |
| 2010/0073970 A1 | 3/2010 | Abolhassani et al. | |
| 2011/0013428 A1 | 1/2011 | Abolhassani et al. | |
| 2011/0235376 A1 | 9/2011 | Feng et al. | |
| 2012/0092908 A1 | 4/2012 | Piotr et al. | |
| 2013/0088901 A1 | 4/2013 | Bleus et al. | |
| 2013/0107587 A1 | 5/2013 | Xu et al. | |

FOREIGN PATENT DOCUMENTS

| | | |
|---|---|---|
| WO | 2009124564 | 10/2009 |
| WO | 2010036666 | 4/2010 |
| WO | 2011127984 | 10/2011 |

OTHER PUBLICATIONS

European Search Report & Opinion issued in connection with corresponding EP Application No. 14198982.2 on Aug. 17, 2015.

* cited by examiner

SYSTEM AND METHOD OF POWER CONVERSION

BACKGROUND OF THE INVENTION

The subject matter disclosed herein relates to power converters.

Power converters may be used to create a variable frequency used to drive various electrical devices (e.g., AC motor) using a generated AC signal. Some driven electrical devices use high quality (e.g., high resolution) output waveforms from low, medium, or high voltages. The resolution of the AC signal may be determined by the number of levels that the power converter can produce. For example, power converters may produce AC signals with three or more available power levels (e.g., low, intermediate, high). Each additional power level adds greater resolution, but additional power levels also increase complexity of the power converter.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system for converting power having multiple current channels includes a first channel configured to conduct current for power conversion. The first channel includes a first set of switches of switches. At least one of the first set of switches is configured to block current through the first channel when current is conducted through remaining channels. Moreover, one or more remaining switches of the first set of switches is configured to reduce voltage stress on the at least one of the first set of switches by coupling the at least one of the first set of switches to an intermediate voltage during blocking. The system also includes a second channel configured to conduct current for power conversion. The second channel includes a second set of switches. At least one of the second set of switches is configured to block current through the second channel when current is conducted through remaining channels, and one or more remaining switches of the second set of switches is configured to reduce voltage stress on the at least one of the second set of switches by coupling the at least one of the second set of switches to an intermediate voltage during blocking.

In a second embodiment, a system for converting power includes multiple channels each including multiple diode-switch pairs. A first subset of the diode-switch pairs are configured conduct current during a conducting state for a respective channel of the plurality of channels. A second subset of the diode-switch pairs is configured to block current through the respective channel during a blocking state. Furthermore, at least one switch of diode-switch pairs is configured to couple the second subset of diode-switch pairs to an intermediate voltage of multiple input voltages during a blocking state for the channel In a third embodiment, a method for converting power includes conducting load current through a first current path of multiple current paths in a power conversion unit using switches, diodes, or a combination thereof. The method also includes blocking one or more additional current paths of the multiple current paths in the power conversion unit using one or more of the switches, one or more of the diodes, or a combination thereof. Furthermore, the method includes reducing potential voltage stress on the one or more switches by using one or more voltage stress reduction switches to reduce a voltage that is blocked by the one or more blocking switches or diodes by connecting an end of each of the one or more switches opposite to a blocking edge to an intermediate voltage node.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As will be discussed below, this disclosure relates to a power converter that uses a configuration of power switches to reduce voltage stress on blocking switches, thereby allowing for the usage of lower power switches. By using power switches with lower voltage ratings, the power converter may be capable of conducting more current since power switches with lower voltage rating often are capable of conducting more current than power switches with higher voltage rating. Furthermore, the power converter may be manufactured more cheaply than a power converter using more expensive higher power switches (e.g., switches rated for 4500V or higher). Moreover, the power converter may be implemented without complicated transformers or additional switches, thereby reducing complexity and costs for manufacture of the power converter. Furthermore, the power converter resolution may be somewhat modular, for example, allowing for the increase of the number of levels by stacking four-level modules or adding additional capacitor levels, thereby increasing flexibility of use of the power converter.

Figure 1:
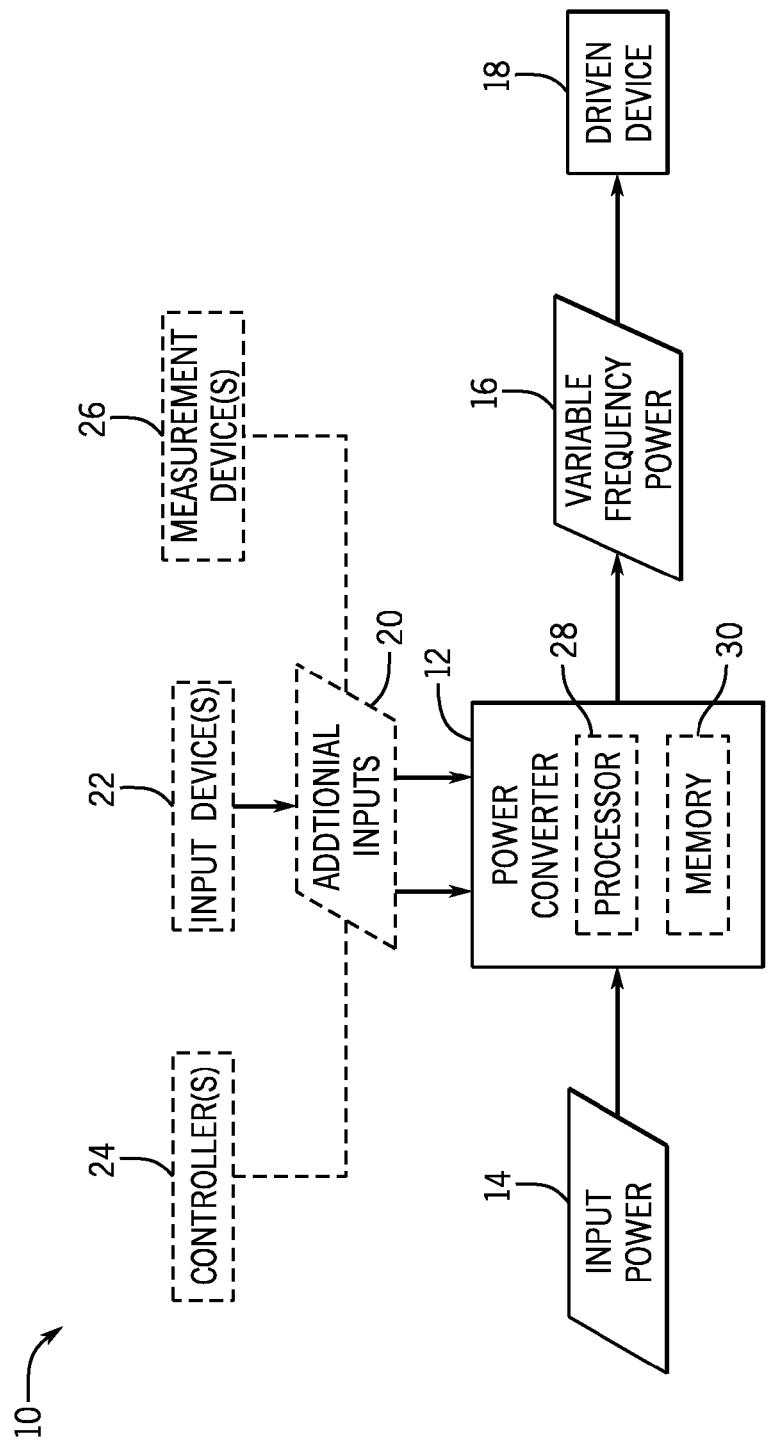
FIG. 1 is a perspective view of an embodiment of a electrical drive system having a power converter.

FIG. 1 illustrates a drive system 10 that includes a power converter 12 that receives an input power 14 and produces a variable frequency power 16 to drive a driven device 18 (e.g., such as an AC electric motor). In some embodiments, the power converter 12 may convert power from direct current (DC) to alternating current (AC). On other embodiments, the power converter 12 converts power from an input AC signal (e.g., input power 14) and produces a different AC signal output (e.g., variable frequency power 16). For example, the power converter 12 may convert the AC input signal to a desired variable frequency power 16 AC signal using a DC link.

In some embodiments, the power converter 12 may receive additional inputs 20 used to control or influence the conversion, such as selecting a desired waveform for the variable frequency power 16. In some embodiments, the additional inputs 20 may include user inputs received from input device(s) 22 such as a human machine interface (HMI) such as a keyboard, touch screen, mouse, or other suitable interface for receiving inputs from a user for controlling power conversion. Additionally or alternatively, some embodiments of the power converter 12 may receive additional inputs 20 from one or more controllers 24 outside the power converter 12, such as a controller 24 used to control an industrial automation system containing the driven device 18. Furthermore, in some embodiments, the power converter 12 may receive additional inputs 20 from one or more measurement device(s) 26. For example, in certain embodiments, the measurement devices 26 may measure operation of the driven device 18 and/or conditions that may affect the driven device 18.

In certain embodiments, the power converter 12 may include a processor 28 and memory 30. In such embodiments, the processor 28 may include a central processing unit of a computing device, an application-specific instruction-set processor (ASIC), a digital signal processor, or some other suitable processor, In certain embodiments, the processor 28 may be used to control switches in relation to various conditions (e.g., additional inputs 20) and in the operation manners discussed below. The memory 30 may include a non-transitory, computer-readable medium that stores instructions for use by the processor 28. In some embodiments, the memory 30 may be volatile (e.g., RAM, DRAM, SRAM) or non-volatile semi-conductor memory (e.g., ROM, EEPROM, etc.), tape, magnetic disks, optical discs (e.g., CD, DVD, etc.), or other non-transitory, computer-readable memory storage devices suitable for storing information for the power converter 12.

Figure 2:
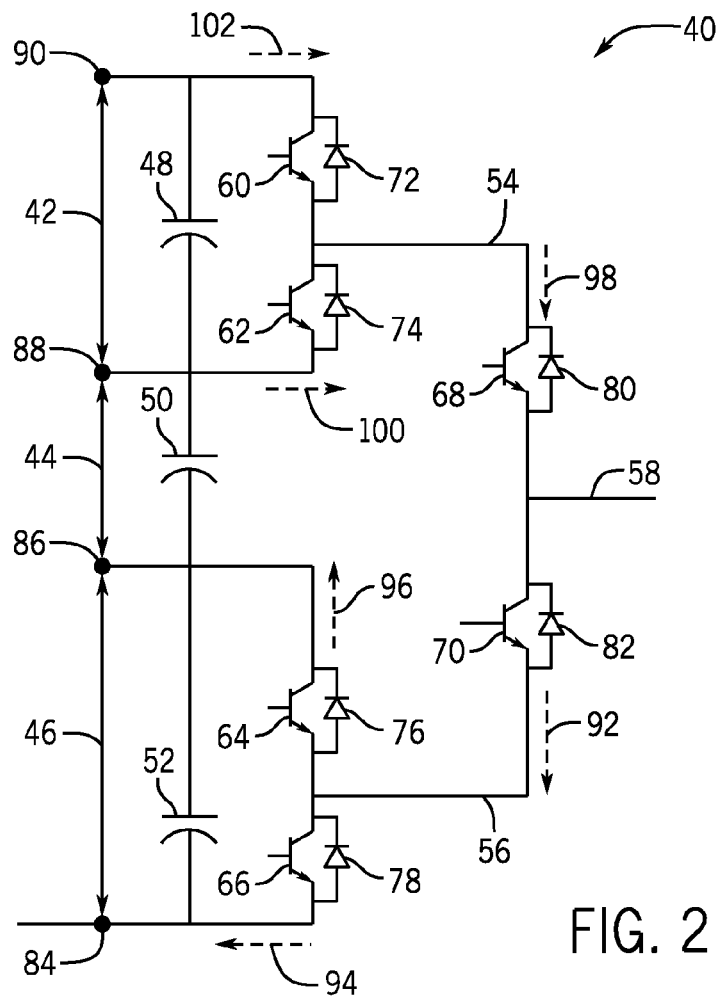
FIG. 2 is a schematic view of a four-level embodiment of the power converter of FIG. 1.
Figure 3:
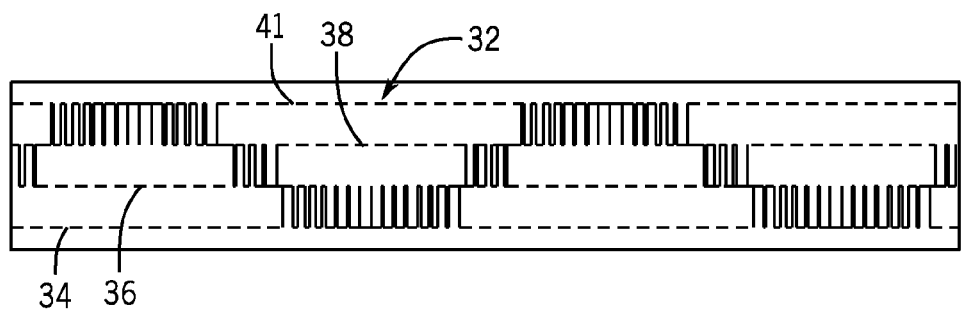
FIG. 3 is a graphical view of an AC output signal that may be produced using the power converter of FIG. 2.

FIG. 2 illustrates a DC-AC conversion portion 40 of the power converter 12 that includes a four-level single-phase configuration that is capable of producing an AC signal, such as the AC signal 32 with four step voltage levels 34, 36, 38, and 41, as illustrated in FIG. 3. The DC-AC conversion portion 40 receives three DC voltages 42, 44, and 46, collectively referenced as DC voltages 42-46. Moreover, in some embodiments, the DC voltages 42-46 may be considered various voltages on a DC voltage rail. Each DC voltage is applied to a respective DC link capacitor 48, 50, and 52, collectively referenced as DC link capacitors 48-52. For example, the DC voltage 42 is applied to the DC link capacitor 48, the DC voltage 44 is applied to the DC link capacitor 50, and the DC voltage 46 is applied to the DC link capacitor 52. In certain embodiments, the DC voltage 42 may be a positive voltage and DC voltage 46 may be a negative voltage with DC voltage 44 being an intermediate voltage with a value between voltages 42 and 46. These voltages 42-46 are alternatively coupled to positive AC node 54 and negative AC node 56, which are alternatively applied to AC node 58. The DC-AC conversion portion 40 also includes power switches 60, 62, 64, 66, 68, and 70, collectively referenced as switches 60-70. In some embodiments, one or more of the power switches 60-70 may be insulated-gate bipolar transistors (IGBT), field-effect transistors (FET), or other transistor types suitable for converting alternating connections between the DC voltages 42-46, positive AC node 54, negative AC node 56, and/or AC node 58. In certain embodiments, one or more of the power switches 60-70 may be a suitable thyristor, such as a gate-turn off thyristor (GTO) or an integrated gate-commutated thyristor (IGCT). The DC-AC conversion portion 40 includes clamping diodes 72, 74, 76, 78, 80, and 82, collectively referenced as diodes 72-82 each connected in parallel to a respective power switch 60-70 to act as a clamping diode. In other words, the diodes 72-82 may reduce/eliminate a sudden voltage spike when one or more of the power switches 60-70 are toggled. The DC voltages 42-46 may be measured as a difference between voltages of DC nodes 84, 86, 88, and 90, collectively referenced as DC nodes 84-90.

During a negative portion of an AC signal, switches 66 and 70 are activated (e.g., toggled on) on thereby coupling the AC node 58 to a DC node 84, which allows current flow through current paths 92 and 94. When switch 70 is toggled off and switch 76 is activated, the AC node 58 is coupled to the node 86 during a negative portion of the AC signal. Current is commutated from current path 94 along current path 96. During a positive portion of the AC signal, switches may be used to route through current path 98 by toggling switches 68 and 62 on and switch 70 off Such toggling of the switches reverses current at the AC output 58 in the direction of the current path 100.

In some embodiments, switch 64 may be deactivated when the switches 68 and 62 are turned on. In such embodiments, the diode 82 and the switch 70 block the voltage difference between DC nodes 88 and 84 (e.g., DC voltage 46 plus DC voltage 44) when the switches 68 and 62 are activated. In other embodiments, the switch 64 may remain on when the switches 68 and 62 are turned on. In such embodiments, the diode 82 and the switch 70 only block DC voltage 44. By reducing the amount of voltage blocked, a lower voltage switch may be used which often allows increased current such that the power converter 40 can be built with a higher volt ampere rating.

When the AC signal switches from a positive signal to a negative signal, a similar commutation strategy may be deployed. For example, at a first positive voltage, the current paths 98 and 102 may be used by switching switches 60 and 68 on. Subsequently, at a lower positive voltage, the current paths 102 and 98 may be used by activating switches to cause the current to flow through diode 74 and switch 68. When switching from current paths 102 and 98 to a negative voltage, through switch 70 and diode 76, switch 62 may remain on to limit the voltage blocked by the switch 68 and diode 80 to that of DC voltage 44, thus allowing the use of a lower voltage switch to be used for switch 68 than otherwise possible if the switch 68 blocks the combination of DC voltages 42 and 44.

Furthermore, when current flows through current paths 96 or 100, the current may flow through either a diode (e.g., diodes 76 or 78) or a switch (e.g., switches 64, 62). Although in ordinary circumstances, toggling the switches on or off may not affect the current, by passing the current through the diodes, consequences of failure to block of same-polarity switches and diodes may be lessened. For example, if current path 100 is used and passed through diode 74, the consequences of failure of switch 60 and diode 72 to block voltage may be reduced.

Figure 4:
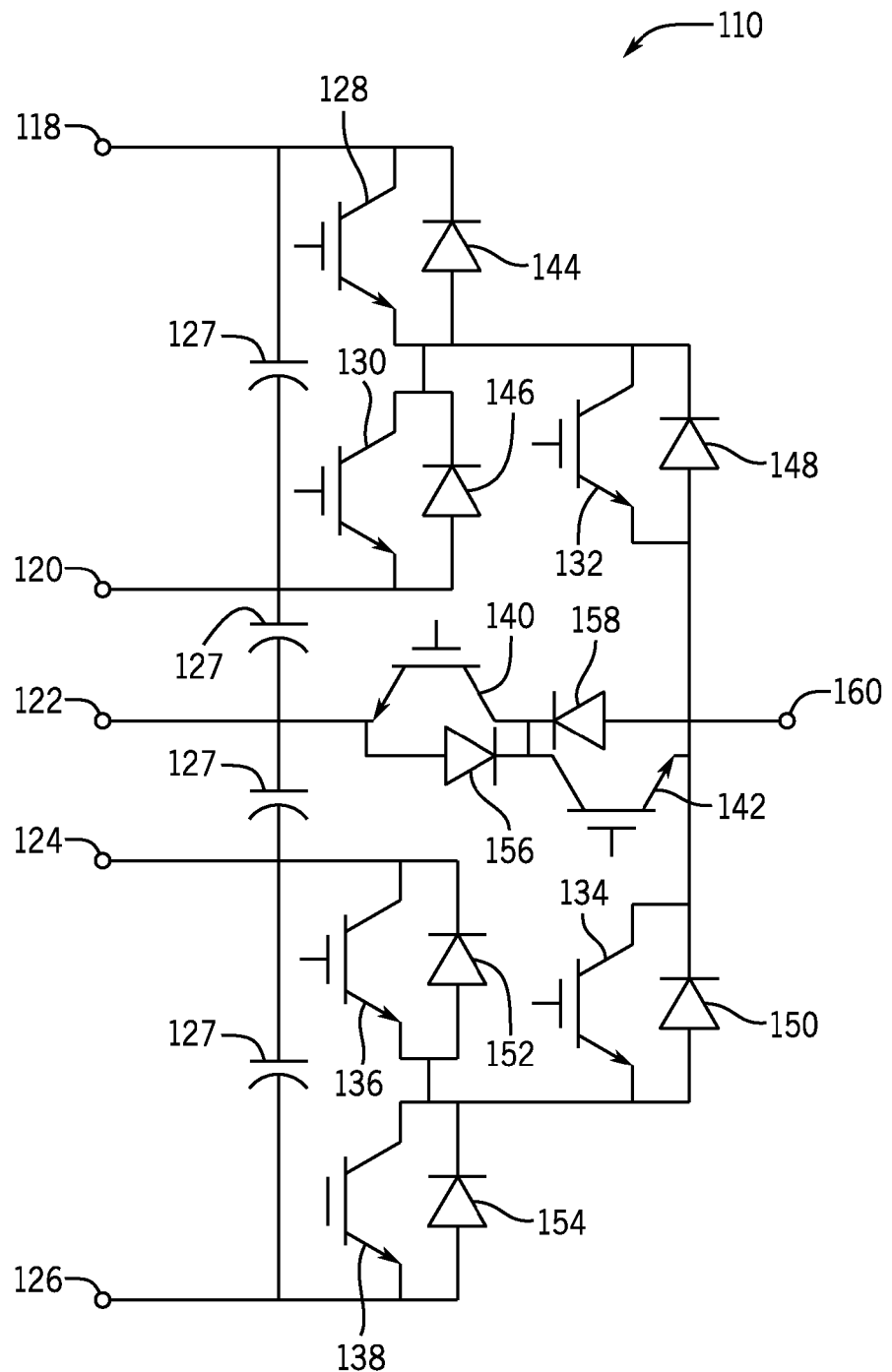
FIG. 4 is a schematic view of a five-level embodiment of the power converter of FIG. 1.

FIG. 4 illustrates a DC-AC conversion portion 110 of the power converter 12 that includes a five-level single-phase configuration that is capable of producing an AC signal with a five-level resolution. The DC-AC conversion portion 110 couples to five voltage node 118, 120, 122, 124, and 126, collectively referenced as voltage nodes 118-126. Each voltage node carries a DC voltage, and the differences in these voltages are applied to respective DC link capacitors 127. In certain embodiments, the voltage nodes 118 and 120 may have a positive voltage and voltage nodes 124 and 126 may have a negative voltage. The voltage node 122 may have a voltage between voltage nodes 120 and 124. In some embodiments, the voltage at voltage node 122 may be a neutral voltage (e.g., 0V). In other embodiments, the voltage at voltage node 122 may be a positive voltage between neutral and the voltage at voltage node 120. In certain embodiments, the voltage at voltage node 122 may be a negative voltage with a voltage between neutral and the voltage at voltage node 124.

The DC-AC conversion portion 110 also includes power switches 128, 130, 132, 134, 136, 138, 140, and 142, collectively referenced as switches 128-142. In some embodiments, one or more of the power switches 128-142 may be insulated-gate bipolar transistors (IGBT), field-effect transistors (FET), or other transistor types suitable for converting alternating connections between the for the voltage nodes 118-126. In certain embodiments, one or more of the power switches 128-142 may be a suitable thyristor, such as a gate-turn off thyristor (GTO) or an integrated gate-commutated thyristor (IGCT). The DC-AC conversion portion 110 may also include clamping diodes 144, 146, 148, 150, 152, 154, 156, and 158, collectively referenced as diodes 144-158 in parallel to a respective power switch 128-142 to act as a clamping diode. In other words, the diodes 128-142 may reduce/eliminate a sudden voltage spike when one or more of the power switches 128-142 are toggled. Finally, using the switches 128-142 and the diodes 144-158, the voltage nodes are alternatively coupled to an AC output 160.

In certain embodiments, when the DC-AC conversion portion 110 initially has a current flowing out of the output node 160, the DC-AC conversion portion 110 produces a first voltage level with switch 128 and switch 132 on and conducting load current. To reduce voltage stress on switch 134, switch 136 may also be on, similar to the voltage stress reduction discussed above. To produce a second voltage level, switch 128 is turned off and switch 130 is turned on with switch 132 remaining on. Diode 144 recovers through switch 130, and load current flows through diode 146 and switch 132. To achieve a third voltage level, switch 132 is turned off allowing switch 140 to recover diode 146 and diode 148 through diode 158. Diode 146 and diode 148 share a voltage during recovery. To achieve a fourth voltage level, switch 140 and switch 142 are turned off while turning on switch 134 and switch 136, diode 158 is recovered through diode 156 switch 134 and diode 152 with switch 130 remaining on to lessen the voltage stress on switch 132. Diode 158 and diode 152 share voltage during recovery. Load current flows through switch 136 and diode 150. To achieve the fifth voltage level, switch 136 is turned off and switch 138 is turned on. Diode 152 is recovered through switch 138 with load current flowing through diode 154 and diode 150. The operation may then be repeated to produce any desired voltage level.

In certain embodiments, when an indeterminate current flows into or out of the output node 160 of the DC-AC conversion portion 110, a first voltage level may be produced by conducting load current through switch 128 and switch 132 or diode 144 and diode 148 with switch 130 off Switch 136 is activated to reduce voltage stress on switch 134. To achieve the second voltage level, switch 128 is turned off with switch 130 turned on. Switch 132 and switch 136 remain on. By leaving switch 136 on, the voltage stress on switch 134 is reduced. The load current flows through diode 146 and switch 132 or switch 130 and diode 148. To achieve the third voltage level, switch 132 is turned off allowing center switch 140 to recover diode 146 and diode 148 through diode 158 during which diode 146 and diode 148 share a voltage. During the third voltage level, the load current flow in either direction through switch 140 and diode 158 or switch 142 and diode 156. Moreover, by leaving switch 130 and switch 136 on during the third voltage level, voltage stress on switch 132 and switch 134 are reduced. To produce the fourth voltage level, switch 140 and switch 142 are turned off while switch 134 is turned on, and switch 136 remains on. Diode 158 is recovered through diode 156, switch 134, and diode 152 while diode 158 and diode 152 share a voltage. Load current flows through switch 136 and diode 150 or switch 134 and diode 152. To produce the fifth voltage level, switch 134 and switch 136 are turned off and switch 138 is turned on. Diode 152 recovers through switch 138. While the load current flows through diode 154 and diode 150 or switch 138 and diode 150, switch 130 remains on to reduce voltage stress on switch 132. The operation may then be repeated to produce any desired voltage level.

In some embodiments, when a load current flows into the output node 160 of the DC-AC conversion portion 110, a first voltage level may be produced with diode 144 and diode 148 conducting load current and switch 136 turned on to reduce voltage stress on switch 134. To achieve the second voltage level, switch 128 is turned off, switch 130 is turned on, and switch 136 remains on to reduce voltage stress to switch 134. Diode 144 recovers through switch 130. Load current flows through switch 130 and diode 148. To achieve the third voltage level, switch 140 is turned on to recover diode 146 and diode 148 through diode 158 with switch 130 and switch 136 remaining on to reduce voltage stress on switch 132 and switch 134. Load current flows through diode 158 and switch 140. To achieve the fourth voltage level, switch 140 is turned off, and switch 134 is turned on. Diode 158 is recovered through diode 156, switch 134, and diode 152 with diode 158 and diode 152 sharing a voltage during recovery. Load current flows through switch 134 and diode 152. To achieve the fifth voltage level, switch 136 is turned off while switch 138 is turned on during which diode 152 is recovered through switch 138. Load current flows through diode 154 and diode 150 or switch 138 and switch 134 while switch 130 remains on to reduce voltage stress on switch 132. The operation may then be repeated to produce any desired voltage level.

Figure 5:
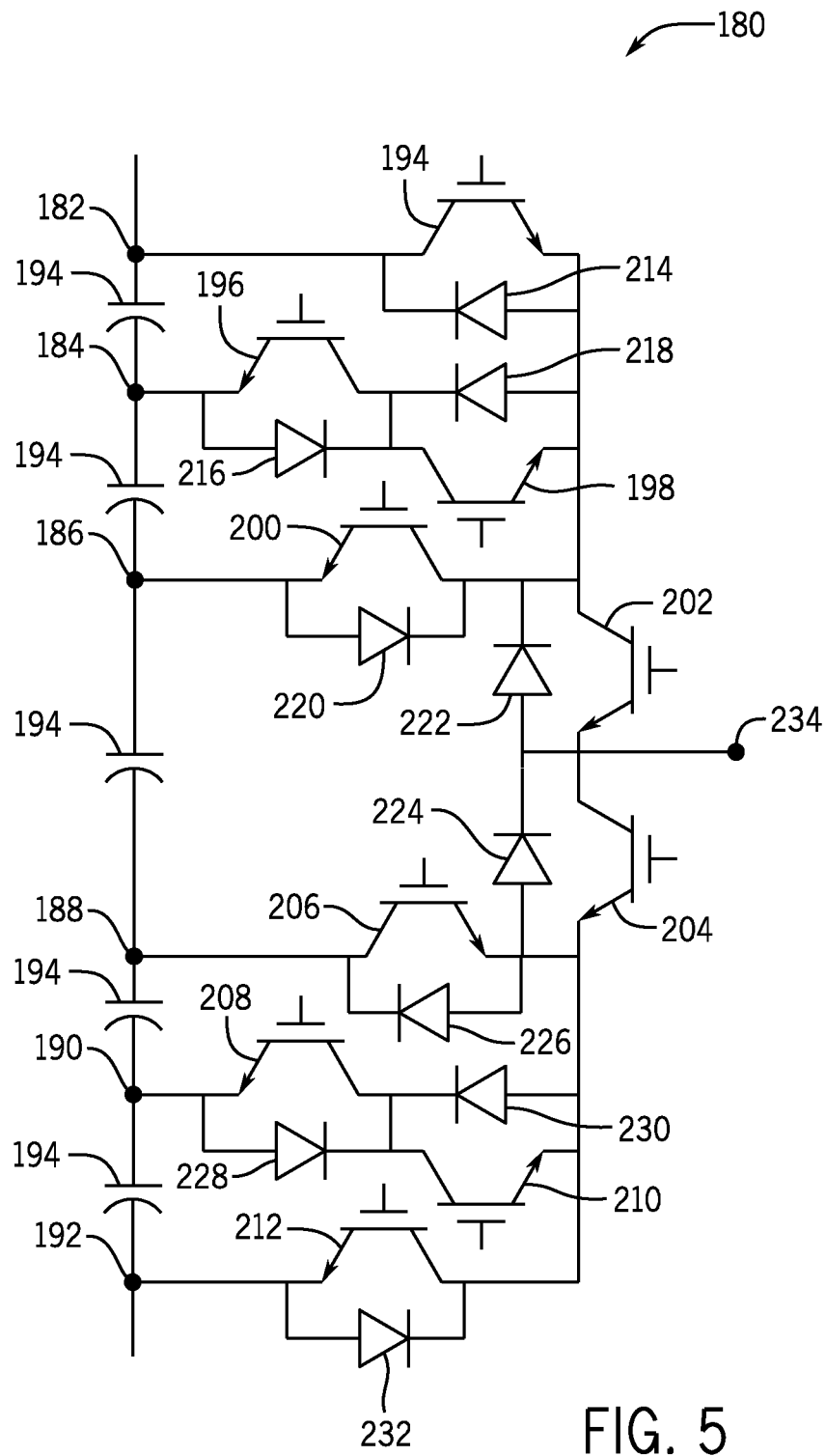
FIG. 5 is a schematic view of a six-level embodiment of the power converter of FIG. 1.

FIG. 5 illustrates a DC-AC conversion portion 180 of the power converter 12 that includes a six-level single-phase configuration that is capable of producing an AC signal with a six-level resolution. The DC-AC conversion portion 180 couples to six voltage node 182, 184, 186, 188, 190, and 192, collectively referenced as voltage nodes 182-192. Each voltage node carries a DC voltage, and the differences in these voltages are applied to respective DC link capacitors 194. In certain embodiments, the voltage nodes 182, 184, and 186 may have a positive voltage, and voltage nodes 188, 190, and 192 may have a negative voltage. In other embodiments, each of the voltage nodes 182-192 may have homogenous or other heterogenous mixtures of voltage polarities.

The DC-AC conversion portion 180 also includes power switches 194, 196, 198, 200, 202, 204, 206, 208, 210, and 212, collectively referenced as switches 194-212. In some embodiments, one or more of the switches 194-212 may be insulated-gate bipolar transistors (IGBT), field-effect transistors (FET), or other transistor types suitable for converting alternating connections between the for the voltage nodes 182-192. In certain embodiments, one or more of the switches 194-212 may be a suitable thyristor, such as a gate-turn off thyristor (GTO) or an integrated gate-commutated thyristor (IGCT). The DC-AC conversion portion 180 may also include clamping diodes 214, 216, 218, 220, 222, 224, 226, 228, 230, and 232, collectively referenced as diodes 214-230 in parallel to a respective power switch 194-212 to act as a clamping diode. In other words, the diodes 214-230 may reduce/eliminate a sudden voltage spike when one or more of the power switches 194-212 are toggled. Finally, using the switches 194-212 and the diodes 214-230, the voltage nodes are alternatively coupled to an AC output 234.

The DC-AC conversion portion 180 works similar to the previously discussed four-level and five-level versions to achieve desired voltage levels by alternatingly coupling the voltage nodes 182-192 to the AC output 234. For example, when a voltage level is produced from voltage nodes 188, 190, or 192, switch 200 may be turned on to limit voltage stress on switch 202. Similarly, when a voltage level is produced from voltage nodes 182, 184, or 186, switch 226 may be turned on to limit voltage stress on switch 204. Furthermore, in certain embodiments, switch pairs (e.g., switches 196 and 198 or switches 228 and 230) may be switched to reduce voltage stress of corresponding switches and/or diodes (e.g., switch 202/diode 222 and switch 204/224, respectively). Thus, each of the voltages available may be used to produce a variable frequency AC signal while voltage stress on individual switches and/or diodes may be reduced.

Figure 6:
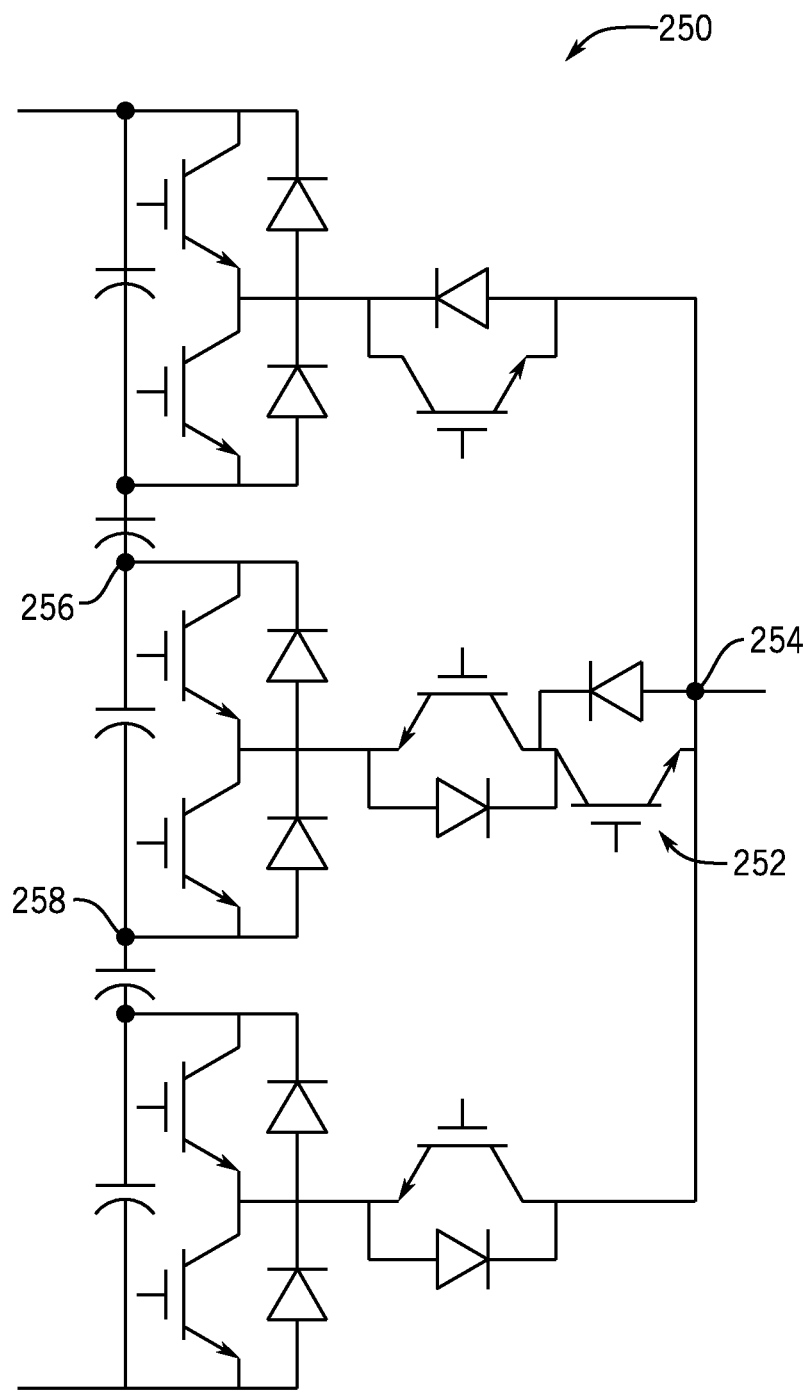
FIG. 6 is a schematic view of an alternative six-level embodiment of the power converter of FIG. 1.

FIG. 6 illustrates a DC-AC conversion portion 250 of the power converter 12 that includes an alternative six-level single-phase configuration that is capable of producing an AC signal with a six-level resolution. The DC-AC conversion portion 250 may operate similar to the five-level single-phase configuration discussed in relation to FIG. 4 discussed above. However, the central portion 252 of the DC-AC conversion portion 250 is configured to alternatively couple the AC output 254 to two-different voltage nodes 256 and 258 instead of a single voltage node (e.g., voltage node 122).

Figure 7:
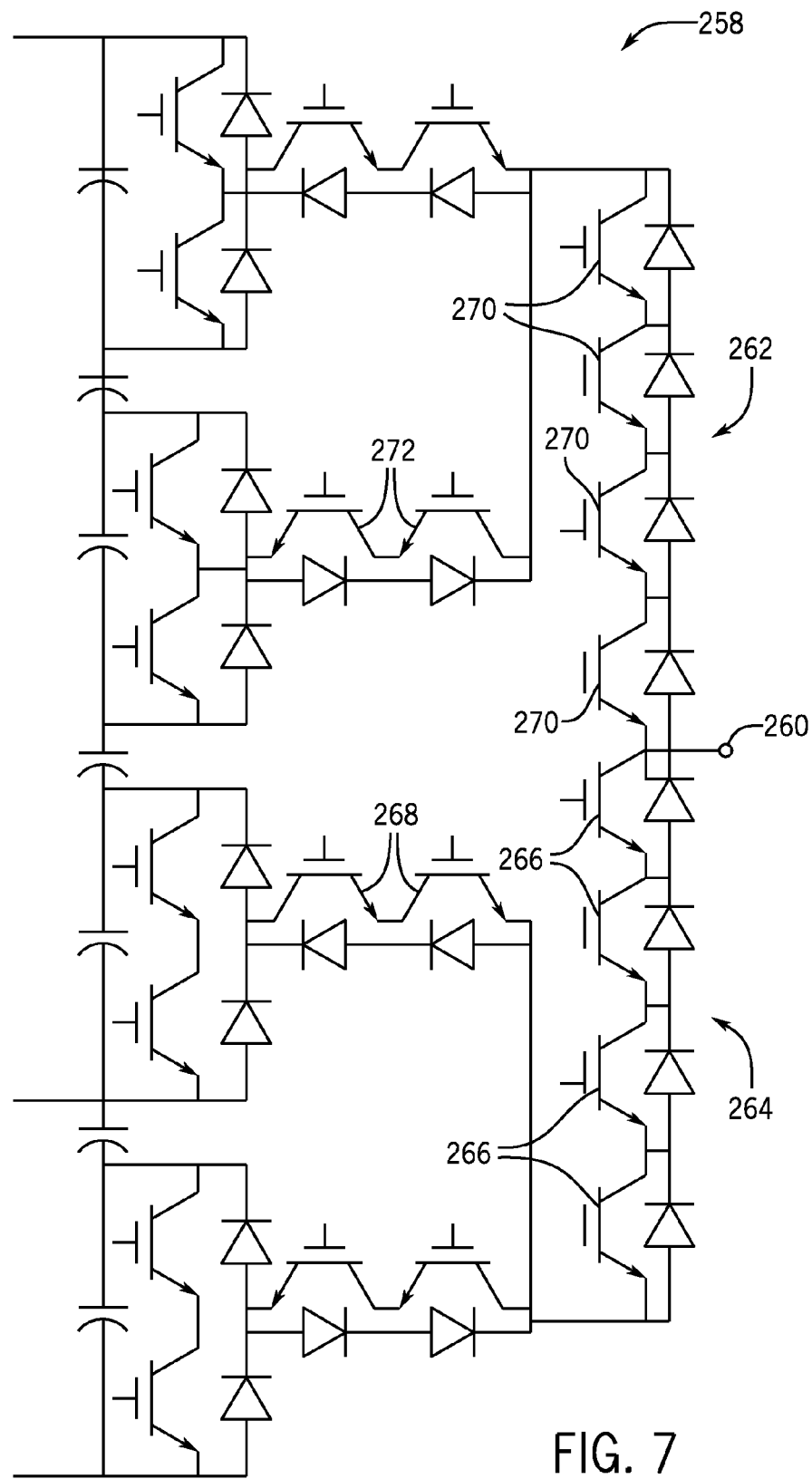
FIG. 7 is a schematic view of seven-level embodiment of the power converter of FIG. 1.

FIG. 7 illustrates a DC-AC conversion portion 258 of the power converter 12 that includes an alternative seven-level single-phase configuration that is capable of producing an AC signal with a seven-level resolution at an AC output 260. The DC-AC conversion portion 258 may be operated in a manner similar to the previously discussed three, four, five, and six-level configurations. Specifically, various voltages may be conducted via channels 262 or 264. When load current is being conducted through channel 262, each switch-diode pair 266 blocks current through the channel 264. To reduce voltage stress on the switch-diode pairs 266, switches 268 may be activated to reduce the amount of voltage that the switch-diode pairs 266 block. Similarly, when load current is conducted through the channel 264, switch-diode pairs 270 block current through the channel 262 with switches 272 activated to reduce voltage stress on the switch-diode pairs.

Figure 8:
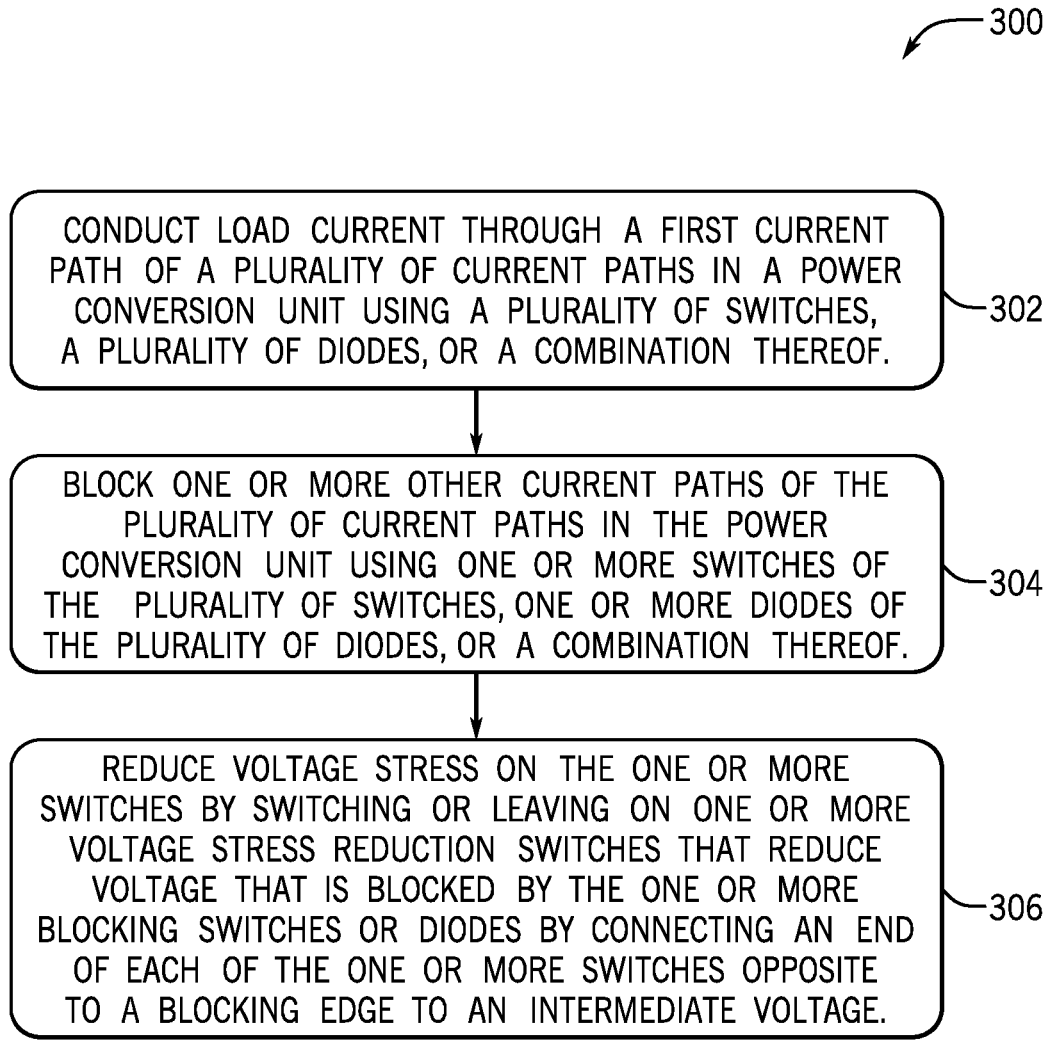
FIG. 8 is a flowchart view of an embodiment of a process for converting power.

FIG. 8 illustrates a process 300 for providing a variable frequency signal from power nodes. The process 300 includes conducting load current through a first current path of a plurality of current paths in a power conversion unit using a plurality of switches or a plurality of diodes (block 302). For example, the load current may be conducted through a positive/negative polarity current path to a higher voltage node, intermediate voltage node, or a lower voltage node depending on the desired output of a waveform created by the power conversion unit. In other embodiments, the load current may be conducted through a neutral/intermediate current path that connects to one or more voltage nodes with voltages between the voltage levels of a higher current path and a lower current path. In various embodiments, multiple channels may be used with each channel containing multiple current paths. Current paths other than the conducting current path may be blocked using the plurality of switches, plurality of diodes, or a combination thereof (block 304). The process 300 also includes reducing voltage stress on blocking diodes or switches by switching on or leaving on one or more voltage stress reduction switches that reduce voltage that is blocked by the one or more blocking switches or diodes by connecting an end of each of the one or more switches opposite to a blocking edge to an intermediate voltage (block 306). In other words, within a channel blocking current/voltage, switches and/or diodes may be connected to an intermediate voltage to reduce the amount of voltage that the switches and/or diodes block thereby reducing voltage stress on the switches and/or diodes and enabling the use of lower power switches (e.g., switches rated for 1200V rather than 4500V).

As previously discussed, by using power switches with lower voltage ratings (e.g., up to 1700V), a power converter may be capable of conducting more current than a power converter using power switches with higher voltage ratings (e.g., 3300V and up). Furthermore, the power converter may be manufactured more cheaply than a power converter using more expensive higher power switches (e.g., switches rated for 4500V). Moreover, the power converter may be implemented without complicated transformers or additional switches thereby reducing complexity and costs for manufacture of the power converter. Furthermore, the power converter resolution may be somewhat modular increasing the number of levels by stacking four-level modules or adding additional capacitor levels, thereby increasing flexibility of use of the power converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for converting power having a plurality of current channels comprising:
   a first channel configured to conduct current for power conversion, wherein the first channel comprises a first plurality of switches, wherein at least one of the first plurality of switches is configured to block current through the first channel when current is conducted through remaining channels of the plurality of current channels, and wherein one or more remaining switches of the first plurality of switches is configured to reduce voltage stress on the at least one of the first plurality of switches by coupling the at least one of the first plurality of switches to an intermediate voltage during blocking to enable the first plurality of switches to block a first blocked voltage that is smaller than a first possible input voltage to the first plurality of switches during blocking; and a second channel configured to conduct current for power conversion, wherein the second channel comprises a second plurality of switches, wherein at least one of the second plurality of switches is configured to block current through the second channel when current is conducted through remaining channels of the plurality of current channels, and wherein one or more remaining switches of the second plurality of switches is configured to reduce voltage stress on the at least one of the second plurality of switches by coupling the at least one of the second plurality of switches to an intermediate voltage during blocking to enable the second plurality of switches to block a second blocked voltage that is smaller than a second possible input voltage to the second plurality of switches during blocking.

2. The system of claim 1, wherein the first channel comprises a first plurality of diodes, wherein each diode of the first plurality of diodes is connected in parallel with a respective switch of the first plurality of switches, and the second channel comprises a second plurality of diodes, wherein each diode of second first plurality of diodes is connected in parallel with a respective switch of the second plurality of switches.

3. The system of claim 1, wherein the plurality of channels comprises a third channel configured to conduct current for power conversion, wherein the third channel comprises a third plurality of switches, wherein at least one of the third plurality of switches is configured to block current through the third channel when current is conducted through remaining channels of the plurality of current channels, and wherein one or more remaining switches of the third plurality of switches is configured to reduce voltage stress on the at least one of the third plurality of switches by coupling at least one of the third plurality of switches to an intermediate voltage during blocking.

4. The system of claim 1, wherein the first and second plurality of switches comprise insulated-gate bipolar transistors (IGBTs).

5. The system of claim 1, wherein the first and second plurality of switches comprise integrated gate-commutated thyristors (IGCTs).

6. The system of claim 1, wherein the first and second plurality of switches comprise gate-turn off thyristors (GTOs).

7. A system for converting power, comprising:
a plurality of channels each comprising a plurality of diode-switch pairs, wherein a first subset of the diode-switch pairs are configured conduct current during a conducting state for a respective channel of the plurality of channels, a second subset of the diode-switch pairs are configured to block current through the respective channel during a blocking state, and at least one switch of the plurality of diode-switch pairs is configured to couple the second subset of diode-switch pairs to an intermediate voltage of multiple input voltages during a blocking state for the channel, wherein coupling the second subset of diode-switch pairs to the intermediate voltage reduces voltage stress on the second subset of diode-switch pairs by enabling the one or more if the diode-switch pairs to block a blocked voltage that is smaller than a possible input voltage to the second subset of diode-switch pairs during blocking.

8. The system of claim 7, wherein when any channel of the plurality of channels is in a conducting state, each of the remaining channels of the plurality of channels is in a blocking state.

9. The system of claim 7, wherein the diodes of the plurality of diode-switch pairs comprises insulated-gate bipolar transistors (IGBTs), integrated gate-commutated thyristors (IGCTs), gate-turn off thyristors (GTOs), or a combination thereof.

10. The system of claim 7, wherein the plurality of channels are configured to provide an output AC signal having four available power levels.

11. The system of claim 10, wherein the plurality of channels comprises:
a first channel comprising:
a first diode-switch pair comprising a first diode and a first switch each coupled in parallel to a first input voltage node and a first intermediate node;
a second diode-switch pair comprising a second diode and a second switch each coupled in parallel to a second input voltage node and the first intermediate node; and
a third diode-switch pair comprising a third diode and a third switch each coupled in parallel to the first intermediate node and an output node; and
a second channel comprising:
a fourth diode-switch pair comprising a fourth diode and a fourth switch each coupled in parallel to a third input voltage node and a second intermediate node;
a fifth diode-switch pair comprising a fifth diode and a fifth switch each coupled in parallel to a fourth input voltage node and the second intermediate node; and
a sixth diode-switch pair comprising a sixth diode and a sixth switch each coupled in parallel to the second intermediate node and the output node.

12. The system of claim 7, wherein the plurality of channels comprises two stacked four-level configurations, wherein each four-level configuration is configured to provide an output AC signal having four available power levels.

13. The system of claim 7, wherein the plurality of channels are configured to provide an output AC signal having five levels of granulation, six levels of granulation, or seven levels of granulation.

14. The system of claim 13, wherein the plurality of channels comprises three channels configured to produce the AC signal with five levels of granulation, wherein the three channels comprise:
a first channel comprising:
a first diode-switch pair comprising a first diode and a first switch each coupled in parallel to a first input voltage node and a first intermediate node;
a second diode-switch pair comprising a second diode and a second switch each coupled in parallel to a second input voltage node and the first intermediate node; and
a third diode-switch pair comprising a third diode and a third switch each coupled in parallel to the first intermediate node and an output node; and
a second channel comprising:
a fourth diode-switch pair comprising a fourth diode and a fourth switch each coupled in parallel to a third input voltage node and a second intermediate node;
a fifth diode-switch pair comprising a fifth diode and a fifth switch each coupled in parallel to a fourth input voltage node and the second intermediate node; and a sixth diode-switch pair comprising a sixth diode and a sixth switch each coupled in parallel to the second intermediate node and the output node; and a third channel comprising seventh and eighth diode-switch pairs coupled in series between a fifth input voltage node and an output node, wherein the seventh diode-switch pair is biased in an opposite direction of the eighth diode-switch pair.

15. The system of claim 13, wherein the plurality of channels comprises two channels configured to produce the AC signal with six levels of granulation, wherein the two channels comprise:

a first channel comprising:
  a first diode-switch pair comprising a first diode and a first switch each coupled in parallel to a first input voltage node and a first intermediate node;
  a second diode-switch pair comprising a second diode and a second switch each coupled in parallel to a second input voltage node;
  a third diode-switch pair comprising a third diode and a third switch each coupled in parallel to the second diode-switch pair and the first intermediate node, wherein the second and third diode-switch pairs are biased in opposite directions; and
  a fourth diode-switch pair comprising a fourth diode and a fourth diode each coupling in parallel to a third input voltage node and the first intermediate node; and
  a fifth diode-switch pair comprising a fifth diode and a fifth switch each coupled in parallel to the first intermediate node and an output node; and a second channel comprising:
  a sixth diode-switch pair comprising a sixth diode and a sixth switch each coupled in parallel to a fourth input voltage node and a second intermediate node;
  a seventh diode-switch pair comprising a seventh diode and a seventh switch each coupled in parallel to a fifth input voltage node;
  an eighth diode-switch pair comprising an eighth diode and an eighth switch each coupled in parallel to the seventh diode-switch pair and the second intermediate node, wherein the seventh and the eighth diode-switch pairs are biased in opposite directions; and
  a ninth diode-switch pair comprising a ninth diode and a ninth diode each coupling in parallel to a sixth input voltage node and the second intermediate node; and
  a tenth diode-switch pair comprising a tenth diode and a tenth switch each coupled in parallel to the second intermediate node and an output node.

16. The system of claim 13, wherein the plurality of channels comprises three channels configured to produce the AC signal with six levels of granulation, wherein the three channels comprise:

a first channel comprising:
  a first diode-switch pair comprising a first diode and a first switch each coupled in parallel to a first input voltage node and a first intermediate node;
  a second diode-switch pair comprising a second diode and a second switch each coupled in parallel to a second input voltage node and the first intermediate node; and
  a third diode-switch pair comprising a third diode and a third switch each coupled in parallel to the first intermediate node and an output node; and a second channel comprising:
  a fourth diode-switch pair comprising a fourth diode and a fourth switch each coupled in parallel to a third input voltage node and a second intermediate node;
  a fifth diode-switch pair comprising a fifth diode and a fifth switch each coupled in parallel to a fourth input voltage node and the second intermediate node; and
  a sixth diode-switch pair comprising a sixth diode and a sixth switch each coupled in parallel to the second intermediate node and the output node; and a third channel comprising:
  a seventh diode-switch pair comprising a seventh diode and a seventh switch each coupled in parallel to a fifth input voltage node and a third intermediate node;
  an eighth diode-switch pair comprising an eighth diode and an eighth switch each coupled in parallel to a sixth input voltage node and the third intermediate node; and
  a ninth diode-switch pair comprising a ninth diode and a ninth switch each coupled in parallel to the third intermediate node;
  a tenth diode-switch pair comprising a tenth diode and a tenth switch each coupled in parallel to the ninth diode-switch pair and the output node, wherein the ninth diode-switch pair is biased in an opposite direction of the tenth diode-switch pair.

17. The system of claim 13, wherein the plurality of channels comprises two channels configured to produce the AC signal with seven levels of granulation, wherein the two channels comprise:

a first channel comprising:
  a first diode switch pair comprising a first diode and a first switch each coupled in parallel to a first input voltage node and a first intermediate node;
  a second diode-switch pair comprising a second diode and a second switch each coupled in parallel to a second input voltage node and the first intermediate node;
  a third diode-switch pair comprising a third diode and a third switch each coupled in parallel to a third input voltage node and a second intermediate node;
  a fourth diode-switch pair comprising a fourth diode and a fourth switch each coupled in parallel to a fourth input voltage node and the second intermediate node;
  a first two or more diode-switch pairs coupled in series between the first intermediate node and a third intermediate node, wherein each diode-switch pair within the first two or more diode-switch pairs is biased in a first direction;
  a second two or more diode-switch pairs coupled in series between the second intermediate node and the third intermediate node, wherein each diode-switch pair within the second two or more diode-switch pairs is biased in a second direction opposite of the first direction; and
  a third two or more diode-switch pairs coupled in series between the third intermediate node and an output node, wherein each of the third two or more diode switch pairs is coupled in a common direction; and a second channel comprising:
  a fifth diode switch pair comprising a fifth diode and a fifth switch each coupled in parallel to a fifth input voltage node and a fourth intermediate node;
  a sixth diode-switch pair comprising a sixth diode and a sixth switch each coupled in parallel to a second input voltage node and the fourth intermediate node;
  a seventh diode-switch pair comprising a seventh diode and a seventh switch each coupled in parallel to a seventh input voltage node and a fifth intermediate node;

an eighth diode-switch pair comprising an eighth diode and an eighth switch each coupled in parallel to an eighth input voltage node and the fifth intermediate node;

a fourth two or more diode-switch pairs coupled in series between the fourth intermediate node and a sixth intermediate node, wherein each diode-switch pair within the fourth two or more diode-switch pairs is biased in the first direction;

a fifth two or more diode-switch pairs coupled in series between the fifth intermediate node and the sixth intermediate node, wherein each diode-switch pair within the fifth two or more diode-switch pairs is biased in the second direction opposite of the first direction; and a sixth two or more diode-switch pairs coupled in series between the sixth intermediate node and the output node, wherein each of the sixth two or more diode switch pairs is coupled in the common direction.

18. A method for converting power, comprising:

conducting load current through a first current path of a plurality of current paths in a power conversion unit using a plurality of switches, a plurality of diodes, or a combination thereof;

blocking one or more additional current paths of the plurality of current paths in the power conversion unit using one or more switches of the plurality of switches, one or more diodes of the plurality of diodes, or a combination thereof; and reducing potential voltage stress on the one or more switches by using one or more voltage stress reduction switches to reduce a voltage that is blocked by the one or more blocking switches or diodes by connecting an end of each of the one or more switches opposite to a blocking edge to an intermediate voltage node, wherein reducing the potential voltage stress on the one or more switches comprises enabling the one or more switches to block a blocked voltage that is smaller than a possible input voltage to the one or more switches during blocking.

19. The method of claim 18, wherein reducing potential voltage stress on the one or more switches by using one or more voltage stress reduction switches comprises turning on or leaving on the one or more voltage stress reduction switches.

20. The method of claim 18, comprising driving an AC motor using the load current.

* * * * *